United States Patent
Dexter et al.

[15] 3,687,892
[45] Aug. 29, 1972

[54] ALKYLTHIOALKANOYLAMINOPHENOL ANTIOXIDANTS FOR ORGANIC MATERIAL

[72] Inventors: Martin Dexter, Briarcliff Manor; Martin Knell, Ossining, both of N.Y.

[73] Assignee: Ciba-Geigy Corporation

[22] Filed: Aug. 20, 1970

[21] Appl. No.: 65,693

Related U.S. Application Data

[62] Division of Ser. No. 803,456, Feb. 28, 1969, Pat. No. 3,590,083.

[52] U.S. Cl..................260/45.9 R, 44/71, 99/163, 252/50, 260/2.5 BB, 260/398.5, 260/666.5
[51] Int. Cl................................................C08f 45/60
[58] Field of Search..260/45.9, 2.5 BB, 398.5, 666.5; 252/50; 44/71; 99/163

[56] References Cited

UNITED STATES PATENTS 3,161,680   12/1964   McManus..................260/562

*Primary Examiner*—Donald E. Czaja
*Assistant Examiner*—V. P. Hoke
*Attorney*—Karl F. Jorda, Bruce M. Collins, Martin J. Spellman, Jr. and Nestor W. Shust

[57] ABSTRACT

Novel alkylthioalkanoylaminophenol compounds are provided by a procedure involving the reaction of an alkylaminophenol and an alkylthioalkanoyl chloride. The alkylthioalkanoylaminophenols are useful as stabilizers of organic materials which are subject to oxidative deterioration.

6 Claims, No Drawings

ALKYLTHIOALKANOYLAMINOPHENOL ANTIOXIDANTS FOR ORGANIC MATERIAL

This application is a division of application Ser. No. 803,456 filed Feb. 28, 1969 now U.S. Pat. No. 3,590,083.

SUMMARY OF THE INVENTION

FIELD OF THE INVENTION

This invention relates to novel antioxidants for organic materials and particularly relates to alkylthioalkanoylaminophenols. These compounds have been found to be useful as stabilizers of organic materials and generally, by including the novel antioxidants in organic materials or contacting the organic materials with the aforesaid antioxidants, the organic materials are protected against oxidative deterioration.

SUMMARY OF THE INVENTION

The novel alkylthioalkanoylaminophenols of the present invention have been found to be useful as stabilizers of organic materials which are subject to oxidative deterioration.

The active compounds of the present invention are obtained by a procedure involving the reaction of a selected alkylaminophenol with an alkylthioalkanoyl chloride. The novel antioxidant compounds of the present invention are either incorporated in the organic material or brought into contact with said organic material and as a result, the organic material will be protected against oxidative deterioration. The prevention of oxidation of various organic material is obviously of primary industrial concern and the novel antioxidant compounds of the present invention are used to prevent oxidative deterioration of a wide variety of commercial products such as synthetic polymers, oils, plastics, and the like.

PREFERRED EMBODIMENTS OF THE INVENTION

The novel alkylthioalkanoylaminophenol antioxidant compounds of the present invention are represented by the formula:

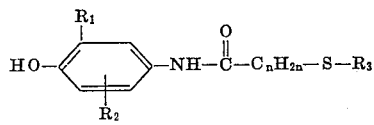

wherein $R_1$ is an alkyl group containing from one to eight carbon atoms or a cycloalkyl group containing from five to 12 carbon atoms $R_2$ is hydrogen, an alkyl group containing from one to eight carbon atoms or a cycloalkyl group containing from five to 12 carbon atoms $R_3$ is an alkyl group containing from four to 24 carbon atoms, and $n$ is a number from 1 to 3.

Illustrative examples of alkyl groups are methyl, ethyl, propyl, isopropyl, butyl, t-butyl, hexyl, octyl, decyl, undecyl, dodecyl, tridecyl, hexadecyl, octadecyl, elcosyl, docosyl, tetracosyl groups, and like. Illustrative cycloalkyl groups include cyclopentyl, cyclohexyl, cyclooctyl, cyclododecyl, and the like.

In a preferred embodiment $R_1$ and $R_2$ are lower alkyl groups having from one to four carbon atoms, especially isopropyl and t-butyl groups, and $R_3$ is a higher alkyl group having more than eight carbon atoms.

The novel alkylthioalkanoylaminophenol compounds of the present invention are prepared by a procedure involving the reaction between the selected alkylaminophenol and alkylthioalkanoyl chloride. The reaction is carried out in a solvent. Examples of useful solvents include, acetone, pyridine, dimethylformamide, water, methyl ethyl ketone, methyl isobutyl ketone, dioxane, and the like.

Stoichiometric amounts of the reactants are employed and a ratio of about 1 mole of the acid chloride to 1 mole of the aminophenol is used; an excess of either reagent can also be used such, as, for example, 1.5 mole of acyl chloride to 1 mole of aminophenol or 1 mole of acyl chloride to 1.5 mole of aminophenol.

In the course of the reaction, hydrogen chloride is liberated forming the amine hydrochloride and consequently an alkaline material is used to neutralize the hydrogen chloride. Suitable alkaline materials which are used to neutralize the hydrogen chloride include, for example, sodium or potassium hydroxide, sodium or potassium acetate, sodium or potassium carbonate, sodium or potassium bicarbonate, and the like.

Included among the acid chlorides which can be used are illustratively, alkylthioacetyl chlorides, alkylthiopropionyl chlorides, alkylthiobutyryl chlorides.

In one typical reaction, 1 mole of an alkylaminophenol such as, for example, 2,6-di-tert-butyl-4-aminophenol dissolved in acetone, is added to 1 mole of an alkylthioalkanoyl chloride such as β-n-octadecylthiopropionyl chloride dissolved in acetone. An alkaline material, such as, for example, sodium hydroxide, is then added to the solution, accompanied by agitation. The desired product is washed, selectively recovered and then dried to obtain the desired alkylthioalkanoylaminophenol product.

In some instances, the starting acid chloride is obtained by reacting the acid, e.g., β-n-octadecylthiopropionic acid, with thionyl chloride, $PCl_3$ or $POCl_3$.

The following examples detail the nature of the present invention but are not to be considered as limiting it.

EXAMPLE I 4-(β-n-octadecylthiopropionyl)amino- 2,6-di-t-butylphenol 17.9 grams (0.05 mole) β-n-octadecylthiopropionic acid was treated with 25 ml thionyl chloride and the mixture was gently heated until solution was complete. The excess thionyl chloride was stripped off and the residue dissolved in 25 mls acetone was added to 11.05 grams (0.05 mole) 4-amino-2,6-di-t-butylphenol in 25 ml acetone. The reaction was mildly exothermic. 50 mls 1 N sodium hydroxide was added, the solution was stirred for 30 minutes and then heated at 60°–70°C for 1 hour. The reaction mixture was then allowed to cool. The solid material was filtered off, washed with water and air dried. Twenty-seven grams of the reaction product was crystallized from methanol and there was obtained 20 grams of the desired product, melting point 74°–82°C. The product was recrystallized from heptane and 18 grams of the substantially pure product was obtained melting between 83.5°–86.5°C.

Analysis: Calculated C, 74.80; H, 11.30
Found C, 74.36; H, 11.27

EXAMPLE II

Following the procedure described in Example I supra, except for the use of 4-amino-2-methyl-6-t-butylphenol and α-octadecylthioacetyl chloride, there was obtained 4-(α-octadecylthioacetyl)amino-2-methyl-6-t-butylphenol.

EXAMPLE III 4-(βdodecylthiopropionyl)amino 2,6-di-t-butylphenol 11.05 grams (0.05 mole) of 2,6-di-t-butyl-4-aminophenol was dissolved in 25 mls acetone and (0.05 mole) β-dodecylthiopropionyl chloride in 25 mls acetone was added thereto. The reaction was mildly exothermic and 50 ml 1 N sodium hydroxide was added portionwise over a few minutes, accompanied by vigrous shaking. The reaction mixture was allowed to stand for 30 minutes, 100 ml water was added thereto, the mixture was stirred and allowed to stand overnight in a refrigerator. The oil which had solidified was filtered off. The product was washed with water and there was obtained 18 grams of a solid material melting between 60° and 70°C. The product was crystallized five times from petroleum ether (250 ml) and then dried. There was obtained ten grams of the desired product melting between 70° and 72°C.

Analysis: Calculated C, 72.90; H, 10.76; N, 2.93; S, 6.7
Found C, 72.80; H, 10.87; N, 3.20; S, 6.8

EXAMPLE IV

Following the procedure described in Example III supra, except for the use of 2,6-dimethyl-4-aminophenol and α-octylthiobutyryl chloride, there was obtained the desired 4-(α-octylthiobutyryl)amino-2,6-dimethylphenol.

Similarly, using the procedure described above, the following novel alkylthioalkanoylaminophenol compounds are prepared:

4-(β-n-dodecylthiopropionyl)amino-2,6-di-t-butylphenol
4-(β-n-octadecylthiopropionyl)amino-2,6-diethylphenol
4-(α-n-hexylthioacetyl)amino-2,6-di-t-amylphenol
4-(β-n-decylthiopropionyl)amino-2,6-dicyclohexylphenol
4-(γ-tetradecylthiobutyryl)amino-2,6-diisopropylphenol
4-(β-n-tetracosylthiopropionyl)amino-2,6-dimethylphenol
4-(γ-n-dodecylthiobutyryl)amino-2-t-butylphenol
4-(β-t-octylthiopropionyl)amino-2-t-butyl-5-methylphenol
4-(β-hexadecylthiopropionyl)amino-2,6-di-t-octylphenol
4-(β-t-amylthiopropionyl)amino-2-cyclododecylphenol
4-(β-t-dodecylthiopropionyl)amino-2-cyclooctylphenol,
4-(α-t-butylthioacetyl)amino-2,6-di-t-butylphenol
4-(β-n-dodecylthiopropionyl)amino-2 methyl-6-t-butylphenol
4-(γ-n-octadecylthiobutyryl)amino-2-cyclopentylphenol
and the like.

The active compounds of the present invention are useful as stabilizers of organic materials normally subject to oxidative deterioration and such ortanic materials include: synthetic organic polymeric substances such as vinyl resins formed from the polymerization of vinyl halides or from the copolymerization of vinyl halides with unsaturated polymerizable compounds, e.g., vinyl esters, α,β-unsaturated aldehydes and unsaturated hydrocarbons such as butadienes and styrene; poly-α-olefins such as polyethylene, polypropylene, polybutylene, polyisoprene, and the like, including copolymers of poly-α-olefins; polyurethanes such as are prepared from polyols and organic polyisocyanates; polyamides such as polyhexamethylene adipamide and polycaprolactam; polyesters such as polymethylene terephthalates; polycarbonates; polyacetals; polystyrene; polyethyleneoxide; and copolymers such as those of high impact polystyrene containing copolymers of butadiene and styrene and those formed by the copolymerization of acrylonitrile, butadiene and/or styrene. Other materials which can be stabilized by the active compounds of the present invention include lubricating oil of the aliphatic ester type, e.g., di(2-ethylhexyl) azelate, pentaerythritol tetracaproate, and the like; animal and vegetable derived oils, e.g., linseed oil, fat, tallow, lard, peanut oil, cod liver oil, castor oil, palm oil, corn oil, cotton seed oil, and the like; hydrocarbon material such as gasoline, mineral oil, fuel oil, drying oil, cutting fluids, waxes, resins, and the like, fatty acids such as soaps and the like.

In general the stabilizers of this invention are employed in amounts of from about 0.005 to about 5 percent by weight of the composition. A particularly advantageous range for polyolefins, such as polypropylene is from about 0.05 percent to about 2 percent.

The stabilizers employed in this invention may be used alone or in combination with other stabilizers or additive materials. Especially useful in certain cases is a composition containing an active compound of the present invention with the stabilizer dilauryl β-thiodipropionate or distearyl β-thiodipropionate.

Furthermore, compounds of the formula:

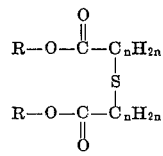

wherein

R is an alkyl group having from six to 24 carbon atoms; and n is an integer from 1 to 6, are useful stabilizers in combination with the novel antioxidant compounds of the present invention.

Other antioxidants, antiozonants, thermal stabilizers, ultraviolet light absorbers, coloring materials, dyes, pigments, metal chelating agents, etc., may also be used, in combination, with the active compounds of the present invention.

It should also be mentioned that phosphite esters may also be used in stabilized formulations containing the novel antioxidants of the present invention and such phosphite compounds including dialkyl phosphites such as, for example, distearyl phosphite, dilauryl phosphite, and the like, trialkyl phosphites such as, for example trilauryl phosphite, tris(ethylhexyl) phosphite, and the like, and tris(alkaryl) phosphites such as, for example tris(nonylphenyl) phosphites, and the like.

EXAMPLE V

Since the oxidation of organic material is slow at ambient temperatures, even in the absence of antioxidants, the testing of the effects of antioxidants must be conducted at high temperatures in order to obtain results within a convenient time, The tests conducted on the following material were made following oven aging in a tubular oven, with an air flow of 400 feet per minute at a temperature of 150°C.

The procedure used involved thoroughly blending unstabilized polypropylene powder, (Hercules Profax 6501) with 0.5 percent by weight of 4-($\beta$-n-octadecythiopropionyl)amino-2,6-di-t-butylphenol. The blended material was then milled on a two-roller mill at 182°C, for 10 minutes, after which time the stabilized polypropylene was sheeted from the mill and allowed to cool.

The milled polypropylene sheet was then cut into pieces and pressed for seven minutes on a hydraulic press at 218°C and 2,000 pounds per square inch pressure. The resultant sheet of 25-mil thickness was tested for resistance to accelerated aging in a force draft oven at 150°C. It was found that on exposure unstabilized polypropylene began to decompose within 3 hours. However, the polypropylene containing 0.1 percent of the aforementioned antioxidant did not decompose for 145 hours and polypropylene containing 0.5 percent of said antioxidant did not decompose for 530 hours. On the addition of 0.5 percent dilaurylthiodipropionate, decomposition occurred at 590 hours. When 4-($\beta$-n-dodecylthiopropionyl)amino-2,6-di-t-butylphenol was tested under identical conditions, decomposition of the polypropylene was observed after 195 hours. On adding 0.5 percent dilaurylthiodipropionate, decomposition was observed at 590 hours.

Similar results are obtained when in the above example 4-($\alpha$-n-butylthioacetyl)amino-2,6-di-t-butylphenol and 4-($\beta$-n-decylthiopropionyl)amino-2,6-dicyclohexylphenol are employed as the stabilizers.

EXAMPLE VI

Stabilized rubber is prepared by mixing in the cold:

| | Parts |
|---|---|
| Havea latex crepe | 100.0 |
| Stearic acid | 1.5 |
| Zinc oxide | 5.0 |
| Diphenylguanidine | 1.0 |
| Sulfur | 2.5 |
| 4-($\beta$-n-octadecylthiopropionyl)amino-2,6-di-t-butylphenol | 1.0 |

The resultant mixture is vulcanized at 140°C and tested according to ASTM D–1206–52T. It was found that the time required to elongate a test strip from 120 mm. to 170 mm. is considerably shorter for the unstabilized rubber as compared with the stabilized rubber.

Similarly, styrene-butadiene rubber as well as a blend of natural rubber (50 parts) and polybutadiene rubber (50 parts) are stabilized.

EXAMPLE VII

High impact polystyrene resin containing elastomer (i.e., butadiene-styrene) is stabilized against loss of elongation properties by incorporation of 0.5 percent by weight of 4-($\beta$-n-octadecylthiopropionyl)amino-2,6-di-t-butylphenol. Under the test conditions described below, the stabilized resin retains a higher percentage of its original elongation properties, whereas the unstabilized resin retains less elongation properties.

The unstabilized resin is dissolved in chloroform and the stabilizer then added, after which the mixture is cast on a glass plate and the solvent evaporated to yield a uniform film which, upon drying, is removed and cut up, and then pressed for 7 minutes at a temperature of 163° and a pressure of 2,000 pounds per square inch into a sheet of uniform thickness (25 mil). The sheets are then cut into strips, approximately 4 × 0.5 inches. A portion of these strips is then measured for length of elongation in the Instron Tensile tester (Instron Engineering Corporation, Quincy, Massachusetts). The remaining portion of the strips is aged in a forced draft oven for 6 weeks at 75° and thereafter tested for elongation.

EXAMPLE VIII

A stabilized mineral oil composition is prepared by incorporating into a refined mineral oil of 183 S.U.S. at 100°F. (Regal Oil B, Texas Company) 0.005 percent by weight of 4-($\gamma$-n-tetracosylthiobutyryl)amino-2,6-dimethylphenol. An even better stabilization is obtained when in combination with said stabilizer is employed dilaurylthiodipropionate.

EXAMPLE IX

A mixture of nylon 66 flakes and 1 percent by weight of 4-($\beta$-tetracosylthiopropionyl)amino-2,6-dimethylphenol is extruded from a commercial extruder at about 280°C. The thus stabilized polyhexamethylene adipate shows less color development and weight loss after heating at 140°C in a forced air oven for 65 hours than does an unstabilized sample.

When this examples is repeated using 5 percent by weight of said stabilizer, a somewhat higher level of stabilization is attained.

EXAMPLE X

To a high molecular weight crystalline polyethylene is added 0.05 percent by weight of 4-($\beta$-n-octadecylthiobutyryl) amino-2-cyclohexylphenol to improve substantially its thermal stability. An even better stabilization is obtained when 2.0 percent by weight of 4-($\beta$-t-amylthiopropionyl)amino-2-cyclododecylphenol and) 0.05 percent by weight of distearylthiodipropionate are employed.

We claim:

1. A composition of matter comprising orgainic material normally subject to oxidative deterioration containing a stabilizing amount of at least one alkylthioalkanoylaminophenol compound of the formula

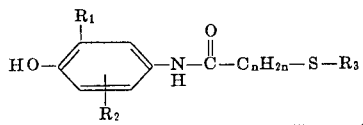

wherein $R_1$ is an alkyl group containing up to eight carbon atoms or cycloalkyl group containing from five to 12 carbon atoms, $R_2$ is hydrogen, an alkyl group containing up to eight carbon atoms or cycloalkyl containing from five to 12 carbon atoms, $R_3$ is an alkyl group containing from four to 24 carbon atoms and $n$ is a number from 1 to 3.

2. A composition of matter comprising organic material normally subject to oxidative deterioration containing a stabilizing amount of a compound, according to claim 1 wherein $R_1$ and $R_2$ are tertiary alkyl groups.

3. A composition of matter comprising organic material normally subject to oxidative deterioration containing a stabilizing amount of an alkylthioalkanoylaminophenol compound, according to claim 1 wherein the compound is 4-($\beta$-n-octadecylthiopropionyl) amino-2,6di-t-butylphenol.

4. A composition of matter comprising organic material normally subject to oxidative deterioration containing a stabilizing amount of an alkylthioalkanoylaminophenol compound, according to claim 1 wherein the compound is 4-($\beta$-n-dodecylthiopropionyl) amino - 2,6-di-t-butyl-phenol.

5. A composition of matter according to claim 1, containing from 0.005 to 5 percent by weight of the alkylthioalkanoylaminophenol compound.

6. A composition of matter according to claim 1 wherein said organic material is polypropylene.

* * * * *

UNITED STATES PATENT OFFICE
CERTIFICATE OF CORRECTION

Patent No. 3,687,892            Dated August 29, 1972

Inventor(s) Martin Dexter et al.

It is certified that error appears in the above-identified patent and that said Letters Patent are hereby corrected as shown below:

Column 1, line 64, "elcosyl" should read -- eicosyl --.

Signed and Sealed this

Sixth Day of September 1977

[SEAL]

Attest:

RUTH C. MASON
Attesting Officer

LUTRELLE F. PARKER
Acting Commissioner of Patents and Trademarks